(12) United States Patent
Mallebrein et al.

(10) Patent No.: US 8,352,154 B2
(45) Date of Patent: Jan. 8, 2013

(54) METHOD AND DEVICE FOR OPERATING AN INTERNAL COMBUSTION ENGINE IN THE CONTEXT OF A COMBINED DIRECT AND MANIFOLD INJECTION, A COMPUTER PROGRAM, A COMPUTER PROGRAM PRODUCT

(75) Inventors: Georg Mallebrein, Korntal-Muenchingen (DE); Michael Frank, Vaihingen/Enz (DE); Alexander Schenck Zu Schweinsberg, Moeglingen (DE); Helerson Kemmer, Vaihingen (DE); Wolfgang Samenfink, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 469 days.

(21) Appl. No.: 12/456,599

(22) Filed: Jun. 17, 2009

(65) Prior Publication Data
US 2009/0319154 A1 Dec. 24, 2009

(30) Foreign Application Priority Data

Jun. 18, 2008 (DE) .......................... 10 2008 002 511

(51) Int. Cl.
G06F 19/00 (2011.01)
G06G 7/70 (2006.01)
G66F 7/00 (2006.01)
F02B 17/00 (2006.01)
F02B 7/00 (2006.01)

(52) U.S. Cl. ........ 701/103; 123/430; 123/431; 123/299; 701/113; 701/102

(58) Field of Classification Search .................. 123/430, 123/431, 429, 294, 295, 296, 305, 578, 575, 123/297, 299, 300, 301, 304; 701/113, 101–105
See application file for complete search history.

(56) References Cited

U.S. PATENT DOCUMENTS

| | | | | | |
|---|---|---|---|---|---|
| 723,447 | A | * | 3/1903 | Eaton | 74/89.13 |
| 5,477,830 | A | * | 12/1995 | Beck et al. | 123/470 |
| 6,659,076 | B2 | * | 12/2003 | Kato | 123/305 |
| 6,959,693 | B2 | * | 11/2005 | Oda | 123/431 |
| 7,055,503 | B2 | * | 6/2006 | Shibagaki | 123/431 |
| 7,082,928 | B2 | * | 8/2006 | Fritsch et al. | 123/478 |
| 7,263,973 | B2 | * | 9/2007 | Akita et al. | 123/431 |
| 7,270,089 | B2 | * | 9/2007 | Wong | 123/27 GE |
| 7,426,918 | B2 | * | 9/2008 | Brehob et al. | 123/431 |
| 7,630,824 | B2 | * | 12/2009 | Hirata | 701/105 |
| 7,694,507 | B2 | * | 4/2010 | Tokuda | 60/284 |
| 7,806,104 | B2 | * | 10/2010 | Sadakane et al. | 123/339.24 |
| 7,869,930 | B2 | * | 1/2011 | Stein et al. | 701/104 |
| 7,895,987 | B2 | * | 3/2011 | Mallebrein et al. | 123/299 |
| 8,005,608 | B2 | * | 8/2011 | Morita | 701/113 |

(Continued)

Primary Examiner — Stephen K Cronin
Assistant Examiner — Raza Najmuddin
(74) Attorney, Agent, or Firm — Kenyon & Kenyon LLP

(57) ABSTRACT

In a control unit, a method, a computer program and a computer program product for operating an internal combustion engine in the context of a combined direct and manifold injection, fuel is injected by at least one first injection valve into an induction manifold and/or by at least one second injection valve directly into a combustion chamber for combustion. In at least one predefined operating state of the internal combustion engine, fuel is only injected by the at least one first injection valve into the induction manifold for a predetermined number of successive combustion cycles. In a subsequent combustion cycle, fuel is injected by the at least one first injection valve into the induction manifold and by the at least one second injection valve directly into the combustion chamber or only by the at least one second injection valve directly into the combustion chamber.

16 Claims, 3 Drawing Sheets

U.S. PATENT DOCUMENTS

2005/0183698 A1* 8/2005 Yonezawa .................... 123/431
2006/0096572 A1* 5/2006 Satou et al. .................. 123/295
2007/0119413 A1* 5/2007 Lewis et al. .................. 123/295
2009/0265078 A1* 10/2009 Mallebrein et al. ........... 701/103

* cited by examiner

| $Q_{desired}$ | N | T | injection frequency | predetermined value |
|---|---|---|---|---|
| H | H | H | very frequent | 1 |
| H | N | M–H | medium – frequent | 3 |
| N | H | M | medium – never | 15 |
| N | N | N | infrequently – never | 31 |

Fig. 3

METHOD AND DEVICE FOR OPERATING AN INTERNAL COMBUSTION ENGINE IN THE CONTEXT OF A COMBINED DIRECT AND MANIFOLD INJECTION, A COMPUTER PROGRAM, A COMPUTER PROGRAM PRODUCT

CROSS-REFERENCE TO RELATED APPLICATIONS

The present application claims priority to Application No. 10 2008 002 511.9, filed in the Federal Republic of Germany on Jun. 18, 2008, which is expressly incorporated herein in its entirety by reference thereto.

FIELD OF THE INVENTION

The present invention relates to a method and device for operating an internal combustion engine in the context of a combined direct and manifold injection, a computer program, a computer program product.

BACKGROUND INFORMATION

PCT International Published Patent Application No. WO 2006/009313 describes a control device for an internal combustion engine, which is used for injecting the fuel by a manifold injection and a direct injection, an injection ratio between the manifold injection and the direct injection being determined as a function of a speed of the internal combustion engine, a load factor, and of a temperature of a coolant of the internal combustion engine. In this context, a minimum injection quantity is always ensured for the direct injection in order to prevent the injection valve used for the direct injection from being clogged by deposits which accumulate on the direct injection valve at high temperatures. A cooling of the direct injection valve is effected by the minimum injection quantity.

The minimum injection quantity for the direct injection must be increased as a function of the temperature of the internal combustion engine in order to provide adequate cooling of the direct injection valve. Moreover, the homogeneity of the air-fuel mixture must be ensured regardless of whether the internal combustion engine is operated solely by direct injection, solely by manifold injection, or by a combination of direct injection and manifold injection. Certain operating states of the internal combustion engine require selecting a smallest possible minimum injection quantity for the direct injection. For example, a very small minimum injection quantity is selected for the direct injection in order to promote the homogeneity of the air-fuel mixture.

SUMMARY

In contrast, the method, the device, the computer program, and the computer program product according to example embodiments of the present invention provide that fuel is injected by at least one first injection valve into an induction manifold and/or by at least one second injection valve directly into a combustion chamber for combustion; in at least one predefined operating state of the internal combustion engine, fuel only being injected by the at least one first injection valve into the induction manifold for a predetermined number of successive combustion cycles; and, in a subsequent combustion cycle, fuel being injected by the at least one first injection valve into the induction manifold and by the at least one second injection valve directly into the combustion chamber or only by the at least one second injection valve directly into the combustion chamber. In this manner, an especially effective cooling of the second injection valve is provided.

The predetermined number of successive combustion cycles may be selected as a function of at least one operating parameter of the internal combustion engine. In this manner, the frequency of the injection by the second injection valve is adapted to the operating state of the internal combustion engine in order to effect cooling of the second injection valve.

An operating characteristic characterizing the temperature prevailing in the combustion chamber of the internal combustion engine may be ascertained; and the predetermined number of successive combustion cycles may be ascertained as a function of the operating characteristic characterizing the temperature prevailing in the combustion chamber of the internal combustion engine.

In this manner, to effect cooling of the second injection valve, the frequency of the injections carried out by the second injection valve is readily adapted to the temperature prevailing in the combustion chamber of the internal combustion engine which temperature determines the level of the impurities on the second injection valve.

The operating characteristic characterizing the temperature prevailing in the combustion chamber of the internal combustion engine may be ascertained as a function of a speed of the internal combustion engine and of a predefined fuel quantity to be injected. In this manner, the temperature prevailing in the combustion chamber of the internal combustion engine is ascertained very simply and reliably.

The predetermined number of combustion cycles may be selected from a table as a function of the operating characteristic characterizing the temperature prevailing in the combustion chamber of the internal combustion engine. In this manner, the predetermined number of successive combustion cycles is readily determined.

Exemplary embodiments of the present invention are illustrated in the drawing and are explained in detail in the following description.

BRIEF DESCRIPTION OF THE DRAWINGS

FIG. 3 is a table for determining a temperature prevailing in combustion chamber T and a predetermined value for the predetermined number of combustion cycles.

DETAILED DESCRIPTION

Figure 1:
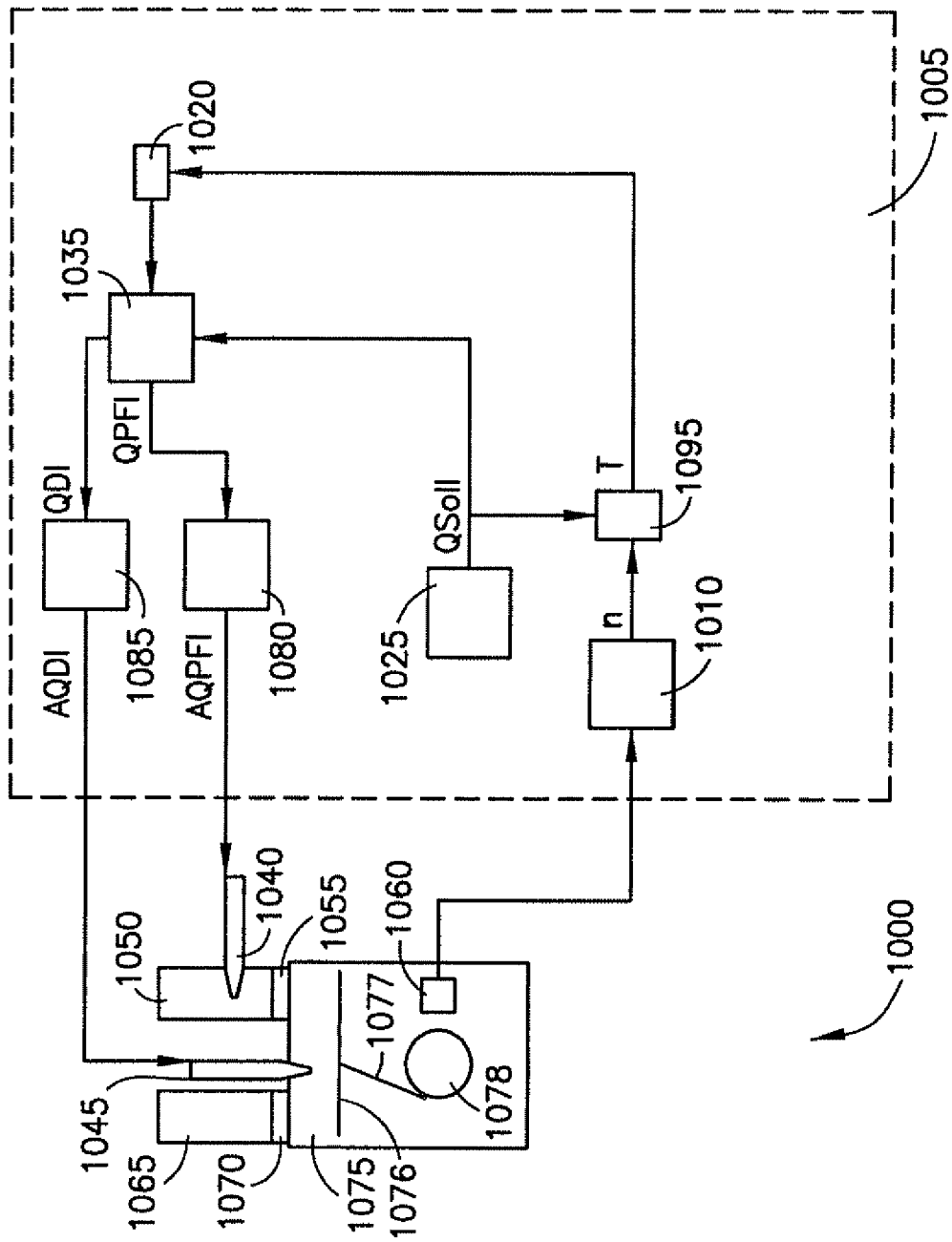
FIG. 1 is a schematic representation of an internal combustion engine.
Figure 2:
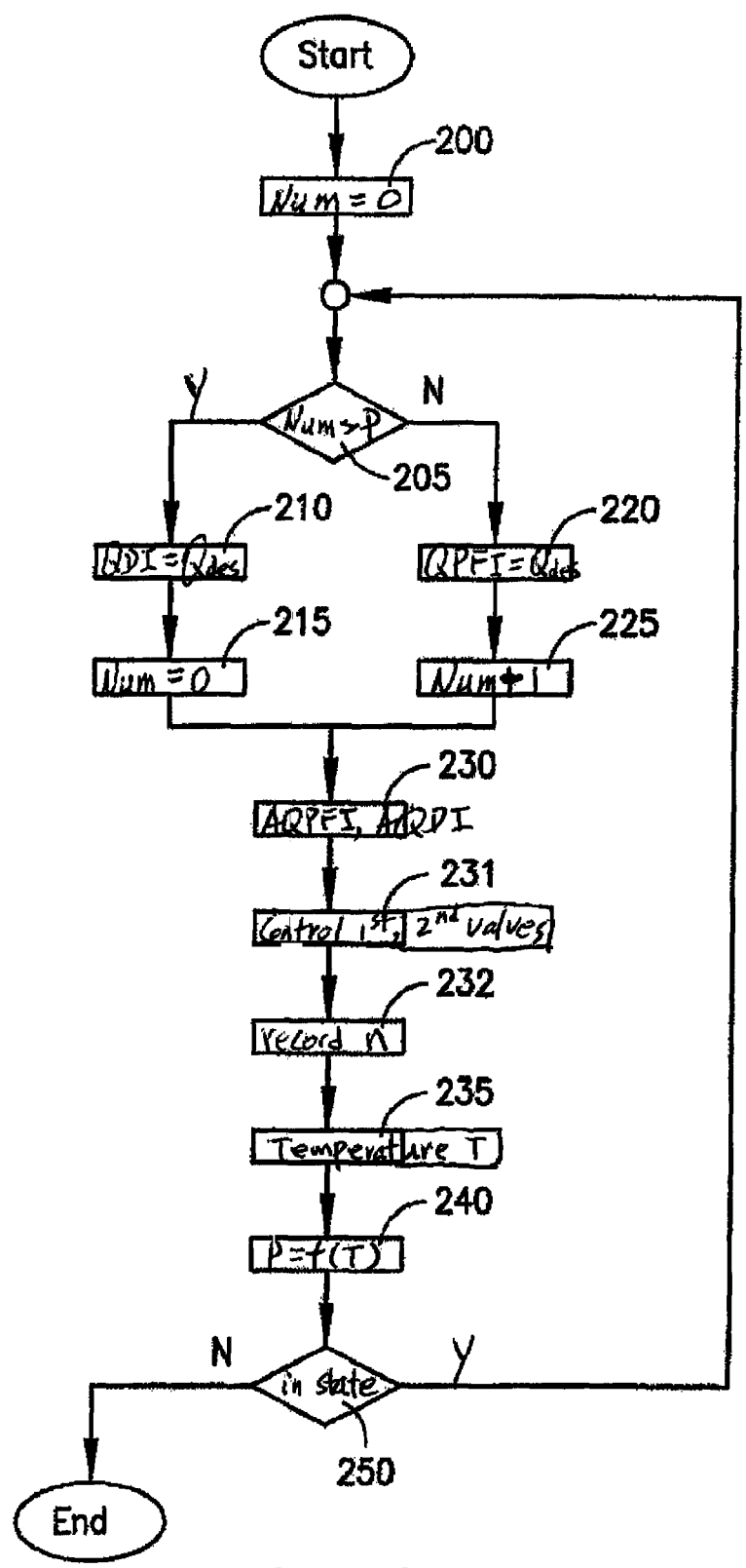
FIG. 2 is a flow chart of a method according to an example embodiment of the present invention.

FIG. 1 shows an internal combustion engine, for example, an Otto or a Diesel engine, denoted by 1000. Internal combustion engine 1000 may have one or a plurality of combustion chambers 1075, of which only one is shown in FIG. 1 for the sake of clarity. In addition, internal combustion engine 1000 has an induction manifold 1050, through which fresh air arrives via an inlet valve 1055 into combustion chamber 1075. Moreover, combustion engine 1000 includes a first injection valve 1040, through which the fuel is injected into induction manifold 1050 for combustion in combustion chamber 1075. Moreover, combustion engine 1000 includes a second injection valve 1045, through which fuel is injected directly into combustion chamber 1075. In the case of an Otto engine, for example, the air-fuel mixture produced by the injection of fuel by first injection valve 1040 and/or second injection valve 1045 in combustion chamber 1075 is ignited by a spark plug. The exhaust emissions generated by the combustion are diverted by an exhaust valve 1070 out of combustion chamber 1075 into an exhaust pipe 1065. Energy produced by the combustion of the air-fuel mixture is transmitted at least partially by a piston 1076 via a connecting rod 1077 to a crankshaft 1078. A thereby resulting rotation of crankshaft 1078 is recorded by a speed sensor 1060.

In addition, internal combustion engine 1000 includes a control unit 1005, in which a recording device 1010, a first sensing device 1020, a first setting device 1025, a second setting device 1035, a first control device 1080, a second control device 1085, as well as a second sensing device 1095 are configured.

Recording device 1010 continuously records a speed signal transmitted by speed sensor 1060 and, in a manner known to one skilled in the art, ascertains a speed n of internal combustion engine 1000 therefrom. First setting device 1025 specifies a total fuel quantity $Q_{desired}$ to be injected. Total fuel quantity $Q_{desired}$ to be injected is ascertained from a driver input, e.g., in a conventional manner, for example, in the case of an internal combustion engine 1000 in a motor vehicle.

Second receiving device 1095 receives speed n of the internal combustion engine from first sensing device 1010, as well as total fuel quantity $Q_{desired}$ to be injected from first setting device 1025. From speed n of internal combustion engine 1000 and total fuel quantity $Q_{desired}$ to be injected, second sensing device 1095 ascertains a temperature prevailing in combustion chamber T, for example, from a table illustrated exemplarily in FIG. 3.

The table from FIG. 3 assigns a temperature T in combustion chamber 1075, for example, to each combination of speed n of internal combustion engine 1000 and total fuel quantity $Q_{desired}$ to be injected. FIG. 3 describes the assignment of temperatures T in combustion chamber 1075 of internal combustion engine 1000 to the corresponding ranges of speed n of internal combustion engine 1000 and of total fuel quantity $Q_{desired}$ to be injected. The high load range corresponds to the range of large total fuel quantities $Q_{desired}$ to be injected and is labeled H in the table from FIG. 3. For an Otto engine, for example, the range of large total fuel quantities $Q_{desired}$ to be injected is the range of total fuel quantity Qdesired to be injected greater than 15 mg of fuel. Total fuel quantities $Q_{desired}$ to be injected smaller than or equal to 5 mg are assigned to the low load range, for example, and are labeled N in FIG. 3. Speed n of internal combustion engine 1000 is divided into a high speed range and a low speed range. For example, speeds n of internal combustion engine 1000 greater than 3000 revolutions per minute are assigned to the high-speed range and are labeled H in FIG. 3. Speeds n lower than or equal to 3000 revolutions per minute are assigned to the low-speed range and are labeled N in FIG. 3. Thus, in accordance with FIG. 3, four values are derived for temperature T in combustion chamber 1075. In FIG. 3, a high temperature in combustion chamber T is labeled H and is assigned to the high-load and high-speed range. In FIG. 3, a middle to high temperature in combustion chamber T is labeled M-H and is assigned to the high-load and low-speed range. In FIG. 3, a medium temperature in combustion chamber T is labeled M and is assigned to the low-load and high-speed range. In FIG. 3, a low temperature in combustion chamber T is labeled M and is assigned to the low-load and low-speed range.

Alternatively or additionally thereto, temperature T in combustion chamber 1075 may also be assigned to speed n and to the load, respectively total fuel quantity $Q_{desired}$ to be injected, for example, by performing an interpolation from a characteristics map. Moreover, the method is not limited to determining four specific temperatures T in combustion chamber 1075. Alternatively, the temperature prevailing in combustion chamber T may be continuously ascertained, for example, from speed n of internal combustion engine 1000 and from the load, respectively, from total injection quantity $Q_{desired}$ to be injected. In place of total fuel quantity $Q_{desired}$ to be injected, alternative quantities may be used which make it possible to infer the load of the internal combustion engine. For example, in the case of an Otto engine, the load may be determined as a function of a throttle-valve angle or, generally, as a function of the output signal of an air-mass flow sensor in induction manifold 1050. The method is then applied analogously.

Alternatively or additionally to ascertaining the temperature in combustion chamber T as a function of the load of internal combustion engine 1000 and speed n of internal combustion engine 1000, temperature T prevailing in the combustion chamber of the internal combustion engine may also be determined from a coolant temperature, an engine block temperature, a cylinder head temperature, or an oil temperature.

Temperature T prevailing in combustion chamber 1075 ascertained from FIG. 3 is output by second sensing device 1095 to first sensing device 1020. First sensing device 1020 ascertains therefrom an injection frequency for injection by second injection valve 1045. To this end, from the table in FIG. 3, a predetermined value is ascertained for the number of successive combustion cycles during which fuel is injected only by first injection valve 1040.

In accordance with FIG. 3, injection is carried out very frequently by second injection valve 1045 when temperature T prevailing in combustion chamber 1075 is high. For example, injection is carried out by second injection valve 1045 for every second combustion. In accordance with FIG. 3, injection is carried out with medium to frequent regularity by second injection valve when middle to high temperatures T prevail in combustion chamber 1075. Medium to frequent injection frequency connotes, for example, that injection is carried out by the second injection valve for every fourth combustion. In accordance with FIG. 3, injection is carried out with medium to infrequent regularity by second injection valve 1045 when middle temperature T prevails in combustion chamber 1075. Injection is carried out, for example, by second injection valve 1045 for every 16th combustion. In accordance with FIG. 3, injection is carried out infrequently to never by second injection valve 1045 when low temperatures T prevail in combustion chamber 1075. For example, injection is carried out by second injection valve 1045 for every 32nd combustion. The predetermined value for the number of successive combustion cycles for which fuel is injected only by first injection valve 1040 into induction manifold, is derived from these values by subtracting by one. In accordance with FIG. 3, the predetermined value for high temperatures in combustion chamber T is selected to be 2−1=1, for example. For middle to high temperatures T in combustion chamber 1075, the predetermined value is selected to be 4−1=3, for example. For middle temperatures T in combustion chamber 1075, the predetermined value is selected to be 16−1=15 in accordance with FIG. 3. For low temperatures T in combustion chamber 1075, the predetermined value is selected to be 32−1=31 in accordance with FIG. 3. The injection frequency and the predetermined value are selected as a function of the configuration of internal combustion engine 1000, as well as of second injection valve 1045. For example, the injection frequency and the predetermined value are ascertained at a test stand in an application step for every operating state of internal combustion engine 1000. In the high-load and high-speed operating state, for example, the frequency of injection by second injection valve 1045 is continually reduced, starting out from an injection by second injection valve 1045, for every combustion until impurities are deposited on second injection valve 1045. The injection frequency is then selected, for example, to be precisely that value from which point on, impurities are not deposited on second injection valve 1045. A corresponding approach is used for the remaining operating states.

Second setting device 1035 reads the predetermined value from first sensing device 1020. From this and from total fuel quantity $Q_{desired}$ to be injected, second setting device 1035 ascertains a direct injection quantity QDI to be injected, as well as an induction-manifold injection quantity QPFI to be injected. To this end, second setting device 1035, for example, in the case of an Otto engine, counts the number of successive combustion cycles in that the ignition pulses of the spark plug, which is located in internal combustion engine 1000 and is provided for igniting the air-fuel mixture, are monitored and counted. For example, as soon as an ignition current flows through the spark plug, the number of successive combustion cycles is increased by one. Second setting device 1035 compares the number of successive combustion cycles to the predetermined value. As long as the number of successive combustion cycles is less than or equal to the predetermined value, total injection quantity $Q_{desired}$ to be injected is completely realized by the induction manifold injection. To this end, induction-manifold injection quantity QPFI to be injected is set to equal total injection quantity $Q_{desired}$ to be injected. Direct injection quantity QDI to be injected is set to zero. In the case that the number of successive combustion cycles is greater than the predetermined value, total fuel injection quantity $Q_{desired}$ to be injected is completely realized by direct injection, for example, for one combustion cycle. To this end, direct injection quantity QDI to be injected is set to equal total injection quantity $Q_{desired}$ to be injected. Induction-manifold injection quantity QPFI to be injected is set to zero.

Induction-manifold injection quantity QPFI to be injected is transmitted by second setting device 1035 to first control device 1080. Direct injection quantity QDI to be injected is transmitted by second setting device 1035 to second control device 1085.

First control device 1080 ascertains a first control signal AQPFI to control first injection valve 1040. To this end, a first desired value for first control signal AQPFI is ascertained from induction-manifold injection quantity QPFI to be injected, in a manner known to one skilled in the art, for example, by a first valve characteristic.

From direct injection quantity QDI to be injected, second control device 1085 ascertains a second control signal AQDI for second injection valve 1045. In this context, a second desired value for second control signal AQDI is ascertained from direct injection quantity QDI to be injected, e.g., in a conventional manner, for example, by a second valve characteristic.

To implement the method, a memory is provided as a computer program, for example, in control unit 1005 in which total injection quantity $Q_{desired}$ to be injected, speed n of internal combustion engine 1000, temperature T prevailing in the combustion chamber, the predetermined value, induction-manifold injection quantity QPFI to be injected, and direct injection quantity QDI to be injected, are stored as variables, for example. In addition, a memory for storing the tables from FIG. 3 is provided in control unit 1005.

The method may always be started, for example, when the internal combustion engine is operated in a predetermined operating state in which the fuel is injected only by first injection valve 1040 into induction manifold 1050 of internal combustion engine 1000. A predetermined operating state of this kind is a partial-load operation, for example.

In the case of a computer program, for example, a process which represents the method is invoked by an operating system, e.g., in a conventional manner.

Once started, the program branches to a step 200.

In step 200, the number of successive combustion cycles in which fuel is only injected by first injection valve 1040 into induction manifold 1050, is set to zero. In addition, the predetermined value is set to zero. The program subsequently branches to a step 205.

In step 205, it is checked whether the number of successive combustion cycles in which fuel is only injected by first injection valve 1040 into induction manifold 1050, exceeds the predetermined value. If the response is affirmative, the program branches to a step 210. If the response is negative, the program branches to a step 220.

In step 210, direct injection quantity QDI to be injected is set to equal total injection quantity $Q_{desired}$ to be injected. Induction-manifold injection quantity QPFI to be injected is set to zero. The program subsequently branches to a step 215.

In step 215, the number of successive combustion cycles in which fuel is only injected by first injection valve 1040 into induction manifold 1050, is set to zero. The program subsequently branches to a step 220.

In step 220, induction-manifold injection quantity QPFI to be injected is set to equal total injection quantity $Q_{desired}$ to be injected. Direct injection quantity QDI to be injected is set to zero. The program subsequently branches to a step 225.

In step 225, the number of successive combustion cycles in which fuel is only injected by first injection valve 1040 into induction manifold 1050, is increased by one. The program subsequently branches to step 230.

In step 230, first desired value for first control signal AQPFI is ascertained from induction-manifold injection quantity QPFI to be injected, and second desired value for second control signal AQDI is ascertained from direct-injection quantity QDI to be injected. The program subsequently branches to a step 231.

In step 231, first injection valve 1040 and second injection valve 1045 are controlled in accordance with the first desired value for first control signal AQPFI and second desired value for second control signal AQDI. The program subsequently branches to a step 232.

In step 232, speed n of internal combustion engine 1000 is recorded. The program subsequently branches to a step 235.

In step 235, temperature T in combustion chamber 1075 of internal combustion engine 1000 is ascertained, for example, in accordance with the table from FIG. 3. The program subsequently branches to a point 240.

In step 240, the predetermined value is ascertained as a function of temperature T in combustion chamber 1075 of internal combustion engine 1000, for example, in accordance with the table from FIG. 3. The program subsequently branches to a step 250.

In step 250, it is checked whether internal combustion engine 1000 is operated in the predetermined operating state in that injection into induction manifold 1050 is carried out only by first injection valve 1040. If the response is affirmative, the program branches to step 205. If the response is negative, the process is ended. To check whether the internal combustion engine continues to be operated in the predetermined operating state, in that the fuel is injected only by first injection valve 1040 into induction manifold 1050, a variable containing information on the operating state of internal combustion engine 1000, for example, is transmitted by the operating system to the process and evaluated in step 250.

In this context, the method is not limited to total injection quantity $Q_{desired}$ to be injected being completely realized by the second injection valve directly into combustion chamber 1075 in accordance with the predetermined number of injections by first injection valve 1040 into induction manifold 1050. Rather, in example embodiments, total fuel quantity $Q_{desired}$ to be injected may be partially realized by injection by first injection valve 1040 into induction manifold 1050. In this context, it is merely provided that direct injection quantity QDI required for sufficiently cooling second injection valve 1045 is realized by injection by second injection valve 1045. To this end, direct injection quantity QDI required for sufficient cooling is ascertained, for example, in an application step for each operating state of the internal combustion engine in accordance with the table from FIG. 3.

In this example embodiment, in step 210, in contrast to the first example embodiment, direct injection quantity QDI is selected to equal the direct injection quantity required at the least for cooling second injection valve 1045. Induction-manifold injection quantity QPFI to be injected is derived then as a difference between total fuel quantity $Q_{desired}$ to be injected and direct injection quantity QDI.

All other method steps of the second example embodiment correspond to the first example embodiment. This second example embodiment improves the mixture formation for specific operating states of the internal combustion engine in which a homogeneous mixture formation may only be achieved by filling total fuel quantity $Q_{desired}$ to be injected.

What is claimed is:

1. A method for operating an internal combustion engine, comprising:
   in at least one predefined operating state of the internal combustion engine, injecting fuel only by at least one first injection valve into an induction manifold of the internal combustion engine for a predetermined number of successive combustion cycles;
   in a subsequent combustion cycle, injecting fuel one of (a) by the at least one first injection valve into the induction manifold and by at least one second injection valve directly into a combustion chamber of the internal combustion engine and (b) only by the at least one second injection valve directly into the combustion chamber;
   ascertaining an operating characteristic characterizing a temperature in the combustion chamber of the internal combustion engine; and
   ascertaining the predetermined number of successive combustion cycles as a function of the operating characteristic characterizing the temperature in the combustion chamber of the internal combustion engine.

2. The method according to claim 1, further comprising:
   selecting the predetermined number of successive combustion cycles as a function of at least one operating parameter of the internal combustion engine.

3. The method according to claim 1, wherein the operating characteristic characterizing the temperature in the combustion chamber of the internal combustion engine is ascertained as a function of a speed of the internal combustion engine and of a predefined fuel quantity to be injected.

4. The method according to claim 1, wherein the predetermined number of successive combustion cycles is selected from a table as a function of the operating characteristic characterizing the temperature in the combustion chamber of the internal combustion engine.

5. A system, comprising:
   a control unit adapted to operate an internal combustion engine having at least one first injection valve adapted to inject fuel into an induction manifold of the internal combustion engine and at least one second injection valve is adapted to inject fuel directly into a combustion chamber of the internal combustion engine, the control unit, in at least one predefined operating state of the internal combustion engine, adapted for injecting fuel only by the at least one first injection valve into the induction manifold for a predetermined number of successive combustion cycles, in a subsequent combustion cycle, adapted for injecting fuel one of (a) by the at least one first injection valve into the induction manifold and by the at least one second injection valve directly into the combustion chamber and (b) only by the at least one second injection valve directly into the combustion chamber;
   wherein the predetermined number is determined as a function of an operating characteristic characterizing a temperature in the combustion chamber of the internal combustion engine.

6. The system according to claim 5, wherein the predetermined number of successive combustion cycles is selected as a function of at least one operating parameter of the internal combustion engine.

7. The system according to claim 5, wherein an operating characteristic characterizing a temperature in the combustion chamber of the internal combustion engine is ascertained, and wherein the predetermined number of successive combustion cycles is ascertained as a function of the operating characteristic characterizing the temperature in the combustion chamber of the internal combustion engine.

8. The system according to claim 7, wherein the operating characteristic characterizing the temperature in the combustion chamber of the internal combustion engine is ascertained as a function of a speed of the internal combustion engine and of a predefined fuel quantity to be injected.

9. The system according to claim 7, wherein the predetermined number of successive combustion cycles is selected from a table as a function of the operating characteristic characterizing the temperature in the combustion chamber of the internal combustion engine.

10. The system according to claim 9, wherein the operating characteristic characterizing the temperature in the combustion chamber of the internal combustion engine is ascertained as a function of a speed of the internal combustion engine and of a predefined fuel quantity to be injected.

11. The system according to claim 6, wherein the operating characteristic characterizing the temperature in the combustion chamber of the internal combustion engine is ascertained as a function of a speed of the internal combustion engine and of a predefined fuel quantity to be injected.

12. The system according to claim 5, wherein fuel is injected for the predetermined number of cycles via the port-fuel injector after an injection of fuel via the direct injection valve.

13. The method according to claim 1, further comprising:
    selecting the predetermined number of successive combustion cycles as a function of at least one operating parameter of the internal combustion engine;
    wherein the operating characteristic characterizing the temperature in the combustion chamber of the internal combustion engine is ascertained as a function of a speed of the internal combustion engine and of a predefined fuel quantity to be injected.

14. The method according to claim 13, wherein the predetermined number of successive combustion cycles is selected from a table as a function of the operating characteristic characterizing the temperature in the combustion chamber of the internal combustion engine.

15. The method according to claim 1, wherein the operating characteristic characterizing the temperature in the combustion chamber of the internal combustion engine is ascertained as a function of a speed of the internal combustion engine and of a predefined fuel quantity to be injected, and wherein the predetermined number of successive combustion cycles is selected from a table as a function of the operating characteristic characterizing the temperature in the combustion chamber of the internal combustion engine.

16. The method according to claim 1, wherein fuel is injected for the predetermined number of cycles via the port-fuel injector after an injection of fuel via the direct injection valve.

* * * * *